United States Patent [19]

Slavitter

[11] Patent Number: 4,951,073
[45] Date of Patent: Aug. 21, 1990

[54] SYNCHRONIZING DEVICE FOR DUAL CAMERA PHOTOGRAPHY

[75] Inventor: Frederick Slavitter, Needham, Mass.
[73] Assignee: Polaroid Corporation, Cambridge, Mass.
[21] Appl. No.: 342,524
[22] Filed: Apr. 24, 1989
[51] Int. Cl.$^5$ .............................................. G03B 17/40
[52] U.S. Cl. ................................... 354/110; 354/267.1
[58] Field of Search ....................... 354/110, 113, 267.1
[56] References Cited

U.S. PATENT DOCUMENTS 4,431,290  2/1984  Kennedy .............................. 354/113
4,488,794  12/1984  Dolgow et al. ........................ 354/83

FOREIGN PATENT DOCUMENTS 2103379  2/1983  United Kingdom .

Primary Examiner—Michael L. Gellner
Attorney, Agent, or Firm—Alfred E. Corrigan

[57] ABSTRACT

Dual camera photography is effected using two conventional cameras of the same or diverse models with, for example, one camera carrying instant film and the other camera housing negative film. Actuation of each of the cameras is controlled by the present synchronizing device so that the shutter of each camera is open when the strobe or flash unit of one of the cameras or one or more remote strobe or flash units controlled by one of the camera's fires. The present synchronizing device assures that both shutters are open when the flash fires by, first measuring the difference in the time lag between camera actuation and the flash sync pulse of each camera, and, second, delaying actuation of one camera relative to the other so that the sync pulse of the strobe firing camera follows the sync pulse of the non-strobe firing camera by a sufficient time interval to allow the shutter of the non-strobe firing camera to open before the flash fires.

8 Claims, 3 Drawing Sheets

SYNCHRONIZING DEVICE FOR DUAL CAMERA PHOTOGRAPHY

BACKGROUND OF THE INVENTION

1. Field of the Invention

This invention relates to remote shutter release apparatus and, more, particularly, it concerns a synchronizing device for sequentially activating a pair of cameras in a manner providing simultaneous separate exposures.

2. Description of the Invention

In many photographic applications, it is desirable to have an instant photograph bearing the positive image corresponding exactly to the negative image recorded on roll type film in a conventional camera, for example. Such a positive instant photograph serves as an instant proof for a photograph to be developed later from the exposed negative film. In order for the instant photograph to serve as a true proof or fully accurate duplifcation, however, of the exposure image stored on the negative film, the actual exposures of the instant film and negative film must be simultaneous and also of the same image light.

One approach to providing such simultaneous exposures on instant film and negative film is to use a camera designed especially for that purpose and in which both types of film are present and light from a single exposure lens and shutter arrangement is split so as to simultaneously expose both types of film. Another approach involves the use of a specialty camera which carries both instant and negative type film, but which has light from two separate exposure lenses travel along separate paths to different film planes.

Although the two above-described approaches may provide for essentially duplicate images on instant and negative type film, they require the use of special cameras designed to house and simultaneously expose two types of film.

Yet another approach to producing simultaneous exposures on instant picture and negative film is known as dual camera photography and entails mounting separate cameras adjacent one another with one camera carrying instant picture film and the other housing conventional roll type negative film.

As described in U.S. Pat. No. 4,488,794 issued to Dolgow et al on Dec. 18, 1984 two like cameras are mounted one on top of the other with the lower camera inverted relative to the upper camera and with the camera back of the upper camera carrying the conventional negative type roll film, while the camera back of the lower camera supports instant positive film. Shutter actuation of the cameras is synchronized mechanically by an idler gear placed between the two cameras in a position to operatively engage with a shutter cocking gear of each camera. The idler gear assures that when the cocking gear of one of the cameras is cocked or released, this motion is transmitted to the cocking gear of the other camera. Each of the cameras is actuated by a respective actuator cable driven by a common, manually operated, actuating plunger.

Such an arrangement of separate cameras mounted adjacent one another and having mechanical shutter synchronization, as described in the above-mentioned U.S. Pat. No. 4,488,794, is facilitated by the use of two cameras of the same model, and, in particular, two Mamiya-Sekor Model RB67 cameras. In order to use two cameras of different models and still have the shutter actuation mechanically synchronized, more complex mounting and synchronizing mechanisms may be required. Further, depending on the various models of cameras combined, different mounting and synchronizing mechanisms dedicated to particular camera combinations may be required.

Moreover, different camera models and individual cameras of even the same model have different lag times between camera actuation, i.e. depression of the shutter release button, and shutter actuation. As such, simply synchronizing camera actuation of two cameras does not necessarily synchronize the actual exposures of the two cameras. While published figures of the time lag between camera actuation and shutter opening are available for different camera models, the true opening time varies from camera to camera due to manufacturing tolerances. This is evidenced by recent developments in computer controlled factory calibration systems which adjust, for example, the control constants in individual camera exposure control programming to compensate in part for variations in shutter operation.

It is common practice in studio photography to use a single burst of flash illumination from one or more flash or strobe units to create an exposure. As such, light from one or more ganged flash sources can be used to provide duplicate exposures in separate cameras provided that the shutters of the cameras are both open to receive the flash illumination reflected from the subject. Having both shutters open simultaneously presents a problem, however, for the above-mentioned reason that the timing of actual shutter opening of cameras of the same model type, much less cameras of different models, varies from camera to camera.

In addition, a photographer may choose to use one of the cameras separate from the other or may want to replace one of the cameras with another camera. Hence, a lengthy assembly and disassembly process required by complex or multiple camera mounting and mechanical synchronizing systems is undesirable.

In light of the foregoing, there is a need for a versatile synchronizing device for synchronizing the shutter opening of two cameras of the same or different models in a manner providing for essentially duplicate exposures by a single burst of flash illumination.

SUMMARY OF THE INVENTION

In accordance with the present invention, a versatile synchronizing device for dual camera photography is provided by which the actual exposures of two cameras of the same or differing models is synchronized in a manner producing essentially duplicate exposures.

In the practice of the present invention, dual camera photography is effected using two conventional cameras of the same or diverse models with, for example, one camera carrying instant film and the other camera housing conventional or non-instant negative film. Actuation of each of the cameras is controlled by the present synchronizing device so that the shutter of each camera is open when the strobe or flash unit of one of the cameras or one or more remote strobe or flash units controlled by one of the cameras is fired.

The present synchronizing device assures that both shutters are fully open and remain fully open during the duration of the flash when the flash fires by delaying actuation of one camera relative to the other so that the sync pulse of the strobe firing camera follows the sync pulse of the non-strobe firing camera by a sufficient time interval to allow the shutter of the non-strobe firing camera to open before the flash fires.

In a preferred embodiment, the synchronizing device of the present invention includes a rectangular housing which supports a variable delay device controlled by a slide member, a sync pulse timing circuit, a digital display panel, and a synchronizer firing button. A pair of twin leads extend from the rectangular housing with each twin lead extending to one of the cameras. One lead of each twin lead terminates in a conventional flash sync pulse plug which is connected to a respective camera sync pulse output. The other lead of each twin lead terminates in a solenoid actuator which is received by a respective camera remote firing receptacle located in its shutter release button.

Among the objects of the present invention are the provision of a synchronizing device for dual camera photography which synchronizes the actual exposures of the cameras in a manner providing essentially duplicate images.

Another object of the invention is to provide such a device by which the variations in time lag between camera actuation and shutter opening of different cameras is accommodated.

Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENT

Figure 1:
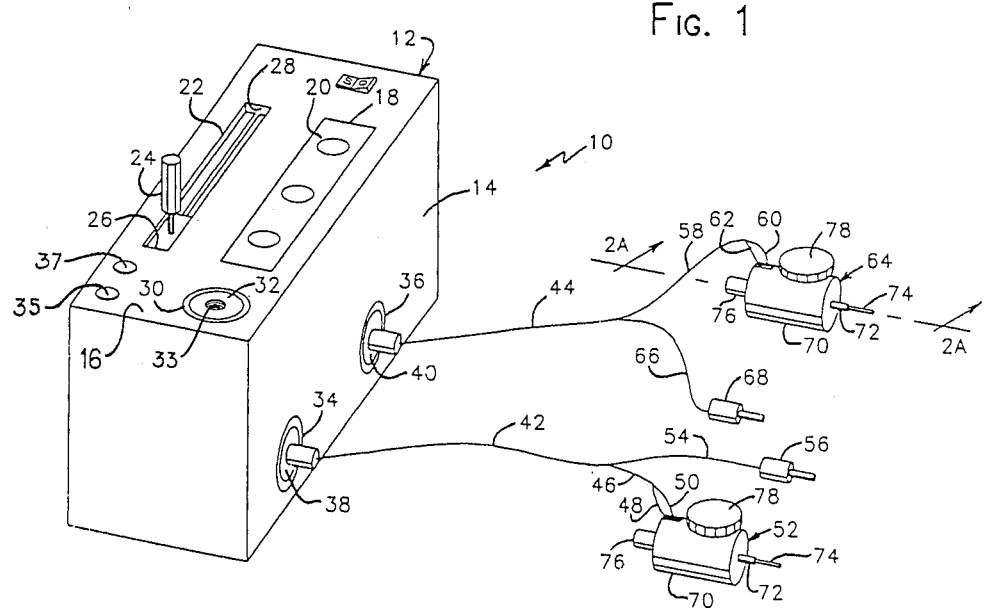
FIG. 1 is a perspective view illustrating a preferred embodiment of a synchronizing device in accordance with the present invention.

In FIG. 1 of the drawings, the synchronizing device of the present invention is generally designated by the reference numeral 10 and shown to include a housing 12 having a parallelepiped configuration and containing a power supply, such as a battery pack, a socket for receiving an external DC power supply, and control circuitry as will be described in greater detail below. The housing 12 includes a vertical front surface 14 and a horizontal upper surface 16. The upper surface 16 has a first rectangular opening 18 which accommodates a digital display panel 20 schematically depicted as displaying the number "000", and second rectangular opening or slot 22 which provides for manual movement of a slide member 24 from the position shown in FIG. 1 adjacent a first end 26 to a second end 28 of the slot 22. A circular opening 30 receives a synchronizer start button 32 having a threaded socket 33 therein for a remote control actuator (not shown). Also mounted in the upper surface 16 is a pair of LEDs 35 and 37 which are electrically coupled to a respective one of a pair of sync pulse plugs 56 and 68 so as to indicate which plug is receiving which sync pulse. Mounted on the opposite end of the upper surface 16 is a pair of depressible switch pads "S" and "O". Depression of pad switch "S" will select the camera having the strobe to be delayed in its shutter actuation relative to the other camera while depression of the switch pad "O" will delay the shutter actuation of the other camera.

The front surface 14 of the housing 12 has a pair of openings 34 and 36 each of which accommodates a plastic grommet 38 and 40, respectively. A pair of twin leads 42 and 44 extend from within the housing 12 with each twin lead passing through a respective grommet 38 and 40. The twin lead 42 includes a first lead 46 having a pair of conductors 48 and 50 which are connected to a solenoid actuator 52. A second lead 54 of the twin lead 42 includes a pair of conductors and terminates in a sync pulse plug or connector 56. In a similar fashion, the twin lead 44 includes a first lead 58 having a pair of conductors 60 and 62 which are connected to a solenoid actuator 64. A second lead 66 of the twin lead 44 includes a pair of conductors which terminate a sync pulse plug 68.

Each of the solenoid actuators 52 and 64 is of identical construction and includes a cylindrical housing 70, an externally threaded camera adapter 72, an actuating rod 74, an adjusting plunger 76, and a locating screw 78, respectively. Although the construction and use of the preferred embodiment of the adjustable solenoid actuators 52 and 64 will be described in greater detail below, it is to be understood that the actuators 52 and 64 are screwed into the camera remote firing receptacle of first and second cameras (not shown), respectively, and that the sync pulse plugs 56 and 68 are coupled with the camera flash sync outputs of the same first and second cameras, respectively. In this manner, the synchronizer and the two cameras form a dual camera photography system.

Figure 2A:
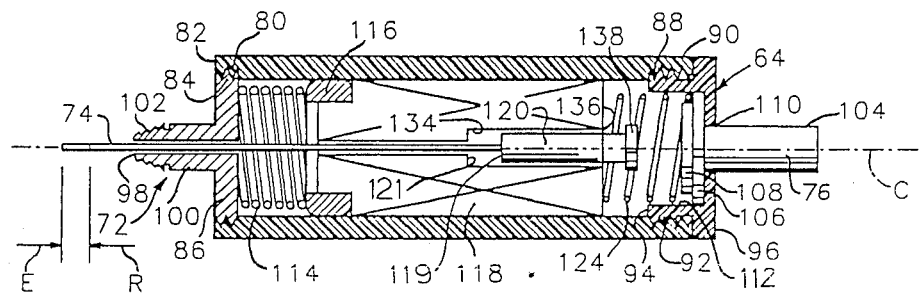
FIG. 2A is an enlarged fragmentary cross section of one of the solenoid actuators of FIG. 1 taken along the line 2A—2A in FIG. 1.
Figure 2B:
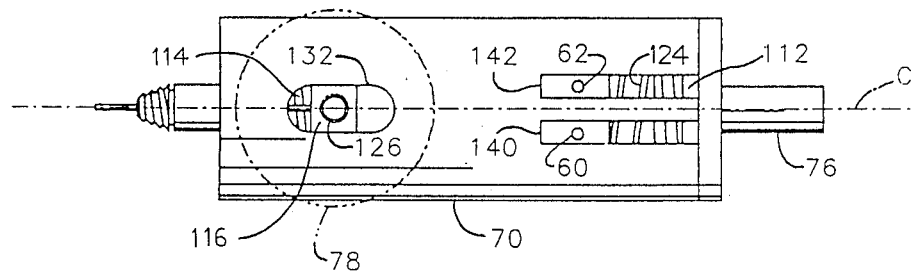
FIG. 2B is a top elevation of the solenoid actuator of FIG. 2A with a locating screw shown in phantom.
Figure 2C:
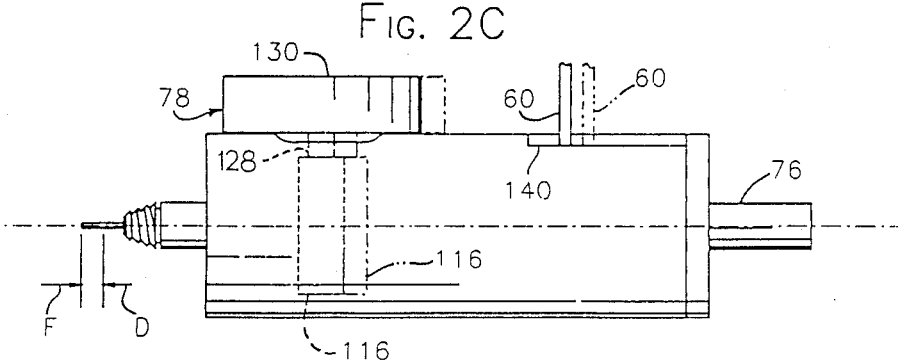
FIG. 2C is a side elevation of the solenoid actuator of FIGS. 2A and 2B with the rearward adjustment position of the locating screw, bushing, and actuator lead shown in phantom lines.

In FIGS. 2A–2C of the drawings, the exemplary actuator 64 is shown in include a cylindrical housing 70 having internal threads 80 at a first end 82 adapted to receive corresponding external threads 84 on the circumference of a large diameter cylindrical portion 86 of the camera adapter 72. The housing 70 also has internal threads 88 at a second end 90 adapted to receive corresponding external threads 92 on at least a portion of the circumference of a small diameter section 94 of an end cap 96. In accordance with a preferred embodiment, the housing 70 and end cap 96 are made of black plastic, while the camera adapter 72 is constructed of stainless steel.

The camera adapter 72 has a small bore central opening 98 which accommodates the actuation rod 74. A small diameter cylindrical portion 100 of the camera adapter 72 ends in tapered external threads 102 adapted to be threaded into a conventional camera remote shutter firing receptacle (not shown). In an exemplary embodiment, the tapered threads 102 have a 50 threads per inch spacing and are of right-hand American standard form adapted for taper tolerances the same as for a class-2 fit.

The adjusting plunger 76 is preferably formed of black plastic as an integral member having a small diameter cylindrical section 104, a large diameter cylindrical section 106, and an intermediate diameter cylindrical section 108. The cylindrical section 104 of the plunger 76 passes through a like-sized cylindrical opening 110 in the end cap 96, while the cylindrical section 106 of the plunger 76 rides in a like-sized cylindrical 112 of the end cap 96.

Contained within the housing 70 between the camera adapter 72 and the adjusting plunger 76, is a bushing spring 114, an annular bushing 116, an electromagnetic coil 118, an armature 120, and a plunger spring 124. In a preferred embodiment, the springs 114 and 124 are each formed with the same number of coils and square ends, but of different diameter wire and with different spring diameters so that the spring force of the bushing spring 114 is greater than that of the plunger spring 124. For example, the bushing spring 114 is made of 0.03 inch diameter music wire with an outer spring diameter of 0.555 of an inch, while the plunger spring 124 is made of 0.02 inch diameter music wire with a spring inner diameter of 0.324 of an inch.

The annular bushing 116 is preferably formed of aluminum and includes a radially oriented, threaded cylindrical bore 126 (FIG. 2B) adapted to receive a threaded end 128 of the locating or set screw 78. In a preferred embodiment, the locating screw 78 is made up of a #10-32 cap screw and a plastic cap 130 having an outer diameter of about ½ an inch to facilitate manual rotation of the cap screw 78.

The threaded shaft 128 (FIG. 2C) of the locating screw 78 passes through an axially oriented, elongate slot 132 in the housing 70 to reach the bushing 116. The slot 132 allows for axial displacement or adjustment of the bushing 116 along the longitudinal axis C as will be described in greater detail below.

The electromagnetic coil 118 has a central hollow or opening 134 which provides for longitudinal reciprocation of the core or armature 120 and the actuating rod 74 which is rigidly affixed to one end of the armature 120. Energization of the coil 118 by current flowing through the conductors 60 and 62 causes movement of the armature 120 and actuating rod 74 from the unenergized resting position labelled R and shown in solid lines in FIG. 2A to an extended camera shutter actuating position labelled E and shown in phantom lines in FIG. 2A.

The conductors 60 and 62 of the lead 58 (FIG. 1) pass through respective axially oriented, elongate slots 140 and 142 in the housing 70 and are connected to the coil 118 in a conventional manner. The slots 140 and 142 allow for axial displacement of the conductors 60 and 62 in response to axial movement of the coil 118 caused by axial adjustment of the locking screw 78 and bushing 116 as shown in phantom lines in FIG. 2C.

Figure 3:
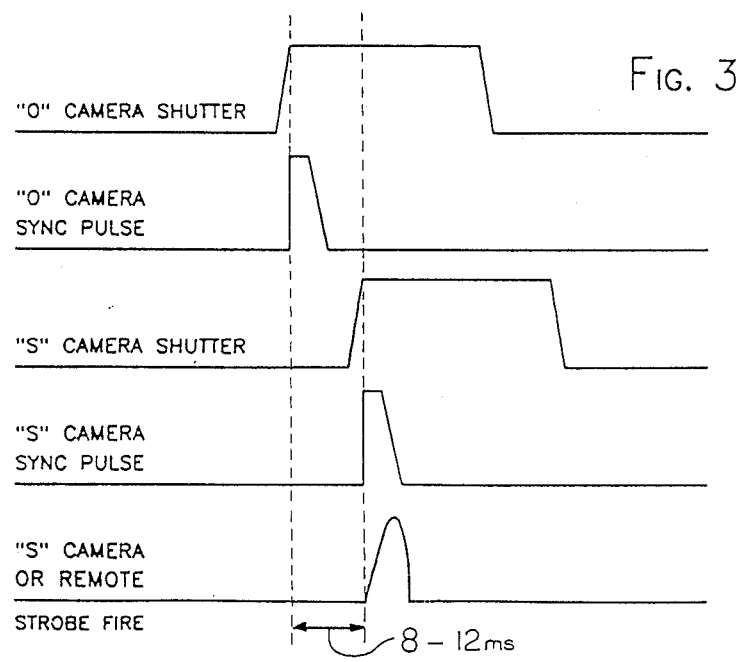
FIG. 3 is a time chart representing the sequential operation of each camera and the strobe firing.

In flash photography, it is the firing of the flash or strobe which in large part dictates the timing and extent of exposure. As shown in FIG. 3, this feature of flash photography is utilized in the present invention by having the sync pulse of only one of the two cameras control the firing of the strobe of that camera or a remote strobe after the shutter of the other or non-strobe firing camera "O" has had time to open. The camera chosen to be the strobe camera "S" can be either the "A" camera (FIG. 5), that is the camera connected to the actuator 52 and plug 56 of twin lead 42 (FIG. 1), or the "B" camera (FIG. 4), that is the camera connected to the actuator 64 and plug 68 of twin lead 44 (FIG. 1). Only one of the cameras, "A" or "B", is the strobe controlling camera "S" during each photographic cycle. With the other or non-strobe firing camera "O" set at a 1/30 of a second shutter speed, this 8–12 ms sync pulse delay assures that the shutter of the non-strobe firing camera "O" has reached full open, and remains open, when the strobe camera "S" fires the strobe to produce the exposures.

In the practice of the present invention, a photographer or synchronizing device user selects a desired combination of two x-sync cameras for dual camera photography and selected one of the two cameras as a strobe or strobe controlling camera and enables or connects the strobe to that camera. The strobe or flash capability of the other non-strobe firing camera "O" is disable or disconnected so that only single flash illumination will be used to produce duplicate exposures in the two cameras. Next, the photographer loosens the locating screws 78 of the solenoid actuators 52 and 64 so that the actuating rods 74 may be moved to their most rearward resting position labelled D in FIG. 2C. Upon loosening of each locating screw 78 a sufficient amount to raise the plastic cap 130 away from the upper surface of the housing 70, the bushing spring 114 forces the annular bushing 116 and coil 118 rearward against the force of the plunger spring 124. Since the spring force of the bushing spring 114 is greater than the countering spring force provided by the plunger spring 124, the bushing 116 and the coil 118 are moved from their forward position shown in FIG. 2B and labelled F in FIG. 2C to the rearward position shown in phantom lines in FIG. 2C.

After each of the solenoid actuators 52 and 64 has been adjusted to its least extending or rearward position (FIG. 2C), the external tapered threads of the camera adapters 72 are threaded into the corresponding internal threads of the shutter's remote firing receptacle of a respective one of the selected two cameras. Next, each of the locating screw 78 is loosened so that upon depression of a respective adjusting plunger 76 into engagement with a collar 138 on the armature 120, and end 119 of the latter moves into engagement with an adjacent surface 121 of the coil 118. Further depression of the adjusting plunger 76 results in the armature 120 and annular bushing 116 moving against the bias of the bushing spring 114 to a forward position so that each actuating rod 74 extends from its respective adapter 72 an amount sufficient to cause actuation of the camera's shutter. Then the locating screws 78 are tightened locking the annular bushings 116 and coils 118 in this position. Thereafter, each of the adjusting plunger 76 is released to allow the actuating rods 74 to retract a small amount (under the bias of the camera's shutter release button as it returns to its original position) back into their respective housings 70 so that the free ends of the actuating rods 74 are located just short of the extended distance necessary to cause camera shutter actuation. In this position, the annular surface 119 of the armature 120 is located closely adjacent to the surface 121 at one end of the opening 134 in the armature 120. Thus, this close proximity provides for a very high magnetic attraction between the armature 120 and the coil 118 upon the energization of the latter. This force will be sufficient to cause the rod 74 to actuate the shutter release button of all cameras for which it is adapted to be used with. In this manner, the solenoid actuators 52 and 64 are adjusted to their most efficient position for the particular camera to which they are connected so that each actuating rod 74 has a short a stroke as possible to effectuate camera actuation upon energization of its respective drive coil 118. Thus, the speed at which each of the adjustable actuators causes camera actuation upon receipt of an energization signal along a respective lead 46 and 58 is as short and efficient as possible.

Figure 4:
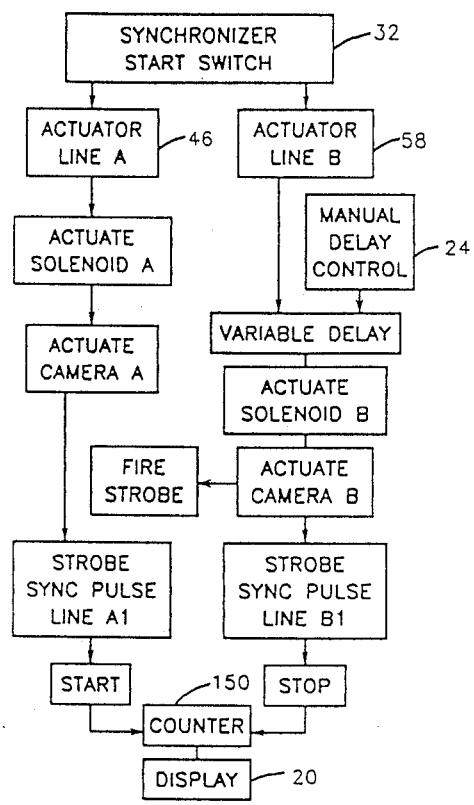
FIG. 4 is a schematic block diagram illustrating the sequential operation of the present synchronizing device with camera B acting as the strobe firing camera.
Figure 5:
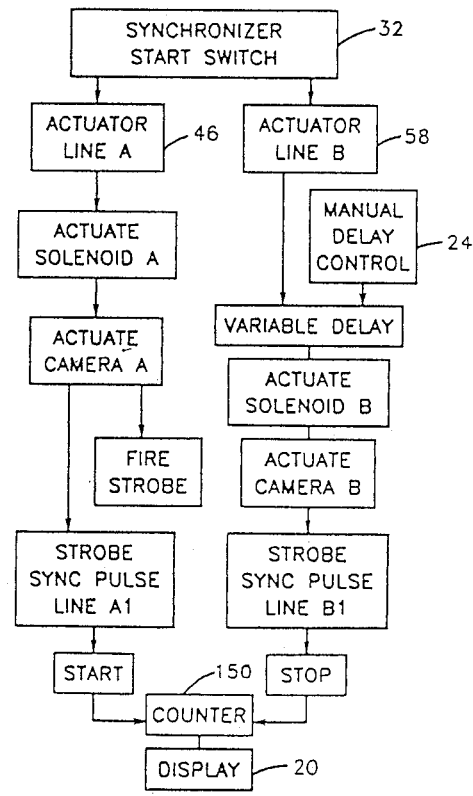
FIG. 5 is schematic block diagram similar to that of FIG. 4 but with camera A chosen to be the strobe firing camera.

Once the adjustable actuators 52 and 64 and the sync pulse connectors 56 and 68 have been connected to their respective "A" and "B" cameras, the present synchronizing device 10 is calibrated in a manner described schematically in FIG. 4 and 5. Prior to actually employing the system for exposing duplicate images, timing of the actuation of the cameras by the synchronizer is set by the camera operator for an appropriate camera actuator delay of one camera with respect to the other based upon the flash sync pulse timing of the cameras thereby eliminating camera variations. With reference to FIG. 4, calibration of the synchronizing device for use with a particular combination of cameras begins following attachment of the adjustable actuators 52 and 64 and sync pulse connectors 56 and 68 to the respective cameras by placing the slide member 24 to a position adjacent the end 26 in slot 22 corresponding to a maximum delay position. The camera selector switch is placed in the S position. Next, the operator depresses the synchronizer start switch 32 to produce a solenoid energizing signal along both actuator line 46 and actuator line 58. With the manual delay control set at max delay, the "S" camera actuator is actuated after the "O" camera is actuated. The sync pulse connectors 56 and 68 receive respective sync pulse signals from cameras "A" and "B" deliver these signals along lines 54 and 66 to a counter circuit 150 located within the synchronizer housing 12. The sync pulse signal provided along line 54 starts the counter 150 counting and the sync pulse from the camera "B" received by line 66 acts as a top signal for the counter 150. The count developed in the counter circuit 150 is displayed on the display panel 20 as, for example, x number of milliseconds between the sync pulse of camera "A" and the sync pulse of camera "B".

With reference again to FIG. 4, the slide member 24 is manually adjusted to a position between the maximum and minimum delay positions corresponding to the ends 26 and 28 of the slot 22 to provide a 8-12 millisecond delay between the sync pulse of the camera "A" and the sync pulse of the camera "B". In other words, the manual delay control 24 is adjusted so that the stop signal for the counter circuit 150 follows the start signal by 8-12 milliseconds and as such a number ranging from 8-12 will be displayed on the display panel 20. The switch pad S is then depressed into its on position. The appropriate position for the manual delay control 24 to produce the delay necessary in actuation of the solenoid actuator 64 following the actuation of solenoid actuator 52 depends on the particular time lag between camera actuation and production of a sync pulse by the cameras "A" and "B".

If the delay counted by the counter circuit 150 and displayed on the display panel 20 is greater than 12 ms with the slide member in the maximum delay position shown in FIG. 1, then the delay control 24 is moved toward the minimum or zero delay position and the synchronizer start button 32 actuated again and the display panel 20 is read again. This procedure is repeated until the display panel 20 reads between 8-12 milliseconds.

In FIG. 5, a sequence of operation similar to that shown in FIG. 4 shown with the exception that camera "A" is chosen to be the strobe firing of strobe controlling camera. As such, the manual delay control 24 is set so that the actuation of the solenoid B is delayed by an appropriate amount with respect to the actuation of the solenoid A to assure that the sync pulse produced by the camera "A" follows the sync pulse produced by the camera "B" by a 8-12 ms delay. The synchronizing device 10 need not be recalibrated until the operator changes which of the cameras is chosen to be the strobe firing or strobe controlling camera or substitutes a different camera for one or both of the cameras "A" and "B".

A better understanding of the present invention can be had by reference to a first exemplary camera combination in which one camera has a time lag between camera actuation and shutter opening of 50 ms (hereinafter referred to as the "fast" camera), while the other has a time lag of 100 ms (hereinafter referred to as the "slow" camera). Because of the large variation between time lags of these two cameras, the "fast" camera will be connected to the actuator 64 and plug 68 of twin lead 44 and, as such be the camera "B". The synchronizing device 10 is set up to delay actuation of camera "B" relative to camera "A". In order for the "fast" camera to be the strobe camera "S" (FIG. 4) and have a sync pulse following the sync pulse of the non-strobe firing or other camera "O" by, for example, 10 ms, actuating of the "fast" camera must be delayed for 60 ms with respect to actuation of the "slow" camera. Also, if the "fast" camera is chosen to be the non-strobe firing camera "O" (FIG. 5) with a sync pulse, for example, 10 ms prior to the sync pulse of the "S" camera, actuation of the "fast" camera must be delayed 40 ms with respect to actuation of the "slow" camera. As such, the "fast" camera in this first example must be the "B" or delayed camera no matter which camera is chosen to be the strobe camera "S".

If this same exemplary "fast" and "slow" camera combination, were to be applied generally to FIGS. 4 and 5, the "fast" camera would be the camera "B" in both FIGS. 4 and 5, but the variable delay set by the manual delay control 24 in FIG. 4 would be in the range of 58-62 ms, while in FIG. 5 it would be in the range of 38-42 ms to provide a 8-12 ms delay between the sync pulse of the "O" and "S" cameras (FIG. 3).

Given a second exemplary combination of two cameras, with one camera having a time lag of 20 ms (hereinafter referred to as the "relatively fast" camera) and the other camera having a time lag of 30 ms (hereinafter referred to as the "relatively slow" camera). In this second example, the "relatively fast" camera need not always be the delayed "B" camera in order to have, for example, a 10 ms delay between the sync pulse of the "O" "S" cameras. For instance, if the "relatively fast" camera is chosen to be the strobe camera "S", then the "relatively fast" camera would have to be actuated 20 ms after actuation of the "relatively slow" camera to provide a ms delay between the sync pulse of the "O" and "S" cameras (FIG. 4). Thus, the "relatively fast" camera must be the delayed camera "B38 .

However, if the "relatively slow" camera were chosen to be the strobe firing camera "S", then either the "relatively fast" or "relatively slow" camera can be the delayed camera "B". With the manually controlled variable delay set to zero or minimum, both the "relatively fast" and "relatively slow" cameras are actuated simultaneously and a 10 ms delay occurs between the sync pulse of the "relatively fast" camera "O" and the sync pulse of the "relatively slow" camera "S" no matter which of the cameras is chosen to be camera "A" or "B".

If a sync pulse delay of less than 10 ms is desired, for example, 8 ms, and the "relatively slow" camera is chosen to be the strobe camera "S", then the "relatively fast" camera must be the delayed camera "B" and is delayed for 2 ms. If a sync pulse delay of greater than 10 ms is desired, for example, 12 ms and the "relatively slow" camera is to be the strobe camera "S", then the "relatively slow" camera must be the delayed camera "B" and is delayed for 2 ms.

In accordance with the preferred embodiment of the present invention (FIG. 3) where the sync pulse of the strobe camera is delayed for a period of 8-12 ms following the sync pulse of the other camera, if the difference in time lag of the two cameras to be used with the present synchronizing device is greater than 12 ms and a flash is utilized, then the faster of the two cameras must always be the delayed camera "B". If the time lag is less than 8 ms, then whichever camera is chosen to be the strobe camera "S" must also be the delayed camera "B". If the difference in time lag is in the range of 8-12 ms, then it depends on which camera is chosen to be the strobe camera "S" and the desired sync pulse delay to determine which camera is to be the delayed camera "B".

Thus, it will be appreciated as a result of the present invention, a highly effective synchronizing device is provided by which the principal object and others are completely fulfilled. It is contemplated and will be apparent by those skilled in the art from the foregoing description and accompany drawing illustrations that variations and/or modifications of the disclosed embodiment may be made without departure from the invention. Accordingly, it is expressly intended that the foregoing description and accompanying drawings are illustrative of a preferred embodiment only, not limiting, and that the true spirit and scope of the present invention be determined by reference to the appended claims.

What is claimed:

1. A synchronizing device for dual camera photography, comprising:
   means for determining the difference in the time lags between camera actuation and sync pulse production in a pair of separate cameras,
   and means for delaying the actuation of one of the cameras relative to the other to assure that the sync pulse of one of the cameras chosen to be the strobe firing camera follows the sync pulse of the other camera by an amount sufficient to assure that the shutter of the non-strobe firing camera is open when the strobe is fired.

2. The device of claim 1, wherein the sync pulse of the strobe firing camera follows the sync pulse of the non-strobe firing camera by about 8-12 ms.

3. The device of claim 2, wherein the means for determining includes means for actuating each of the cameras in a timed fashion, means for sensing the sync pulse of each camera, and means for counting the delay between the sync pulse of each camera.

4. The device of claim 3, wherein the means for delaying includes a variable delay set in response to the counted delay between sync pulses.

5. The device of claim 4, wherein the means for actuating comprises a pair of adjustable solenoid actuators.

6. The device of claim 5, wherein each of the solenoid actuators includes an actuating rod and a locking screw which provides for an adjustment in the unenergized position of the actuating rod to maximize the efficiency of the actuator.

7. A method for producing duplicate images in a plurality of separate cameras, comprising the steps of:
   selecting one of the cameras to be a strobe firing camera, and
   delaying the actuation of at least one of the cameras relative to the others so that an approximately 8-12 ms delay occurs between the sync pulse of each of the other cameras and the sync pulse of the one camera chosen to be the strobe firing camera.

8. The method of claim 7, wherein the step of delaying includes the steps of determining the difference in the time lags between camera actuation and sync pulse production of the cameras;
   displaying the difference; and
   adjusting a variable delay to provide the approximate 8-12 ms delay.

* * * * *